United States Patent [19]

van der Waals et al.

[11] 3,882,888
[45] May 13, 1975

[54] FUEL OIL FLOW CONTROLS
[75] Inventors: Jacobus van der Waals; Petrus J. J. Toonen, both of Nijmegen, Netherlands
[73] Assignee: Controls Company of America, Schiller Park, Ill.
[22] Filed: Nov. 16, 1973
[21] Appl. No.: 416,413

[30] Foreign Application Priority Data
Nov. 23, 1972 United Kingdom.............. 54205/72

[52] U.S. Cl................................. 137/410; 137/456
[51] Int. Cl............................................ F16k 31/26
[58] Field of Search .......... 137/400, 403, 405, 409, 137/410, 456

[56] References Cited
UNITED STATES PATENTS
3,625,244  12/1971  Giwosky .......................... 137/405

FOREIGN PATENTS OR APPLICATIONS
451,669  10/1948  Canada.............................. 137/405

Primary Examiner—Martin P. Schwadron
Assistant Examiner—David R. Matthews
Attorney, Agent, or Firm—Michael, Best & Friedrich

[57] ABSTRACT

A fuel oil flow control device has a chamber in which a constant oil level is maintained by a float-controlled inlet valve. If the valve closes at an above normal oil level, the float must be secured in its raised position until manually released by a manually resettable safety device. This device comprises a generally Z-shaped lever comprising an L-shaped operative arm pivoted at its upper end and a lateral counterbalance arm. The lever is disposed adjacent the float and so immersed in the oil that as the oil level exceeds normal, the increased buoyancy of the lever causes it to tilt into locking engagement with the float.

8 Claims, 4 Drawing Figures

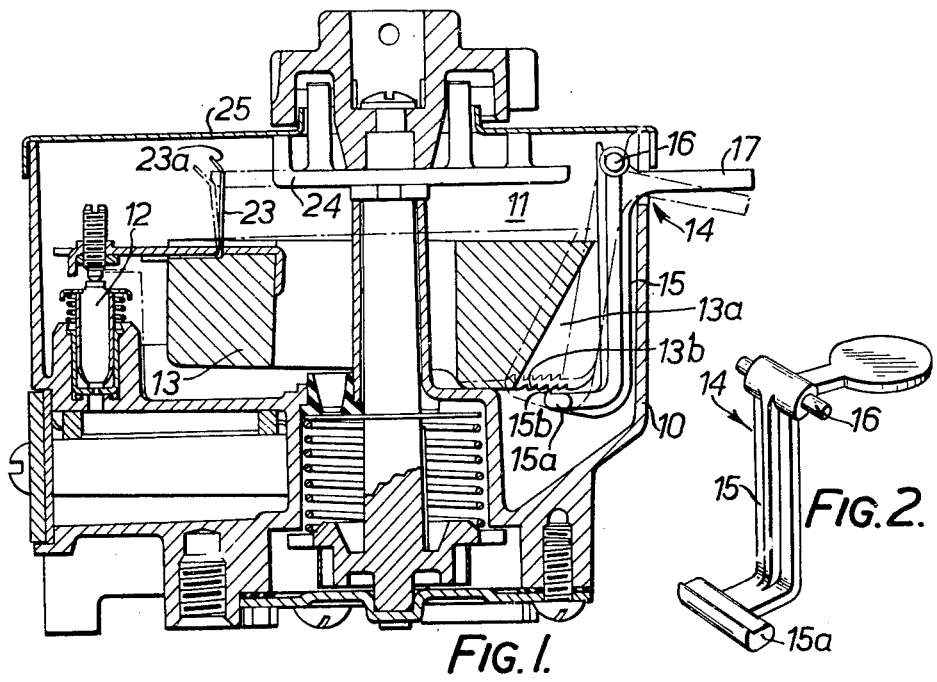
FIG. 1.
FIG. 2.
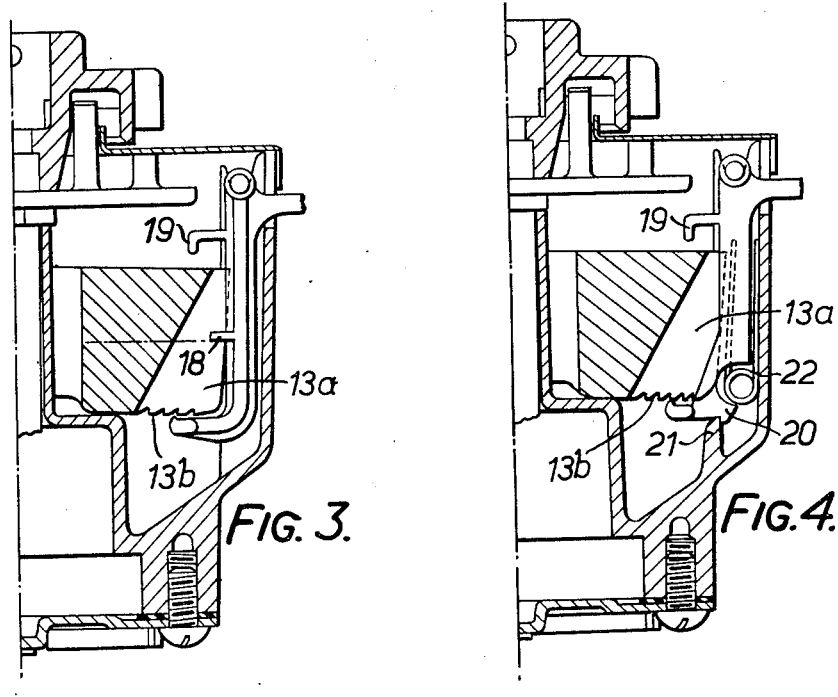
FIG. 3.
FIG. 4.

FUEL OIL FLOW CONTROLS

BACKGROUND OF THE INVENTION

This invention relates to fuel oil flow controls, in particular for controlling the flow of fuel oil to a pot-type burner of a domestic space heater.

Oil flow control devices are known which comprise a housing defining a chamber for containing oil and having an inlet thereto, an inlet valve, a float operatively connected to the inlet valve to maintain a constant level of oil in the chamber, and a safety device operable when the oil level exceeds a predetermined height to apply an upward force to the float.

In U.S. Pat. No. 3,625,244 this safety device takes the form of a safety float fitted pivotally to the main float, the safety float being so shaped that an above normal oil level causes the safety float to tilt into an actuated position in which it adds buoyancy to the main float. The safety float will remain in the actuated position after the oil level has fallen again, holding the inlet valve closed until the safety float has been manually returned to its inactive position. One object of the present invention is to provide a simplified form of safety device.

SUMMARY OF THE INVENTION

According to the invention, the safety device comprises a lever mounted on a horizontal pivot and having an operative arm which, during operation of the device, extends in a downward direction and is partially immersed in the oil within the chamber and a counterbalance arm which is located at all times above the oil within the chamber, the operative arm being movable away from the vertical, under the effect of an increase in its buoyancy resulting from an increase in oil level above said predetermined height, into a position in which it engages the float and applies an upward force thereto.

DESCRIPTION OF THE DRAWINGS

FIG. 1 is a vertical section through an oil flow control device according to the invention showing one form of safety device.

FIG. 2 is a perspective view of the safety device shown in FIG. 1.

FIGS. 3 and 4 are sections corresponding to that of FIG. 1 but showing alternative forms of the safety device.

DESCRIPTION OF THE PREFERRED EMBODIMENTS

As shown, the oil control is of the constant level type having a housing 10 in which oil is admitted to a float chamber 11 via an inlet valve 12 controlled by a float 13 in said chamber. The inlet valve is preferably of the type in which a relatively flat rubber valve closure member is pressed against an inlet orifice in order to close the valve. In such an inlet valve, if a small particle of dirt becomes interposed between the valve closure and the valve seat, the valve will fail to close tight when the float has risen to its normal level, and the consequent leakage through the valve will cause the oil level to increase above normal. However, as the float continues to rise, the pressure of the valve member on the valve seat will increase until ultimately the leakage will usually cease.

It is a requirement, however, following such a malfunction of the inlet valve, that the valve should not open automatically but be manually reset.

According to the embodiment of the invention illustrated in FIGS. 1 and 2, the safety device comprises a manual reset lever 14 having an operative arm 15 depending vertically from a fixed horizontal pivot 16 at its upper end within the housing, a T-shaped extension 15a projecting laterally from the lower end of the vertical portion of the arm and a counterbalance arm 17 extending laterally of the operative arm adjacent the pivot and projecting outwardly through the housing. The counterbalance arm, which also serves as a manual reset handle, counterbalances the extension 15a and maintains the operative arm in a substantially vertical position when the oil is below its normal level. However, as the oil level rises above normal, immersing more of the lever, the buoyancy of the operative arm 15 will increase and the lever will tilt into a position in which the extension 15a engages the float.

To facilitate movement of the lever into a float-engaging position, the float is formed with a vertical slot 13a into which the operative arm 15 of the lever can move as the lever tilts.

The engagement of the lever with the float is intended to allow the float to rise further but prevent it from falling, or at least from falling to a position in which the inlet valve will open.

Consequently, to achieve such locking engagement, the mutually contacting surfaces of the lever extension 15a and of the float can be high friction surfaces, or the surface of the float (which will conveniently be its under-surface) can be formed with ratchet teeth or grooves 13b, and a cooperative hook 15b can be formed on the outer end of the extension 15a.

It will be evident that the lever need not be made of a material lighter than oil since it is not necessary for the lever to float but only for it to be displaced with abnormal rise of oil level, as will be achieved by a change in its buoyancy.

In a modification of the lever shown in FIG. 3, an additional mass in the form of a short arm 18 is attached to the operative arm 15 of the lever in a position in which the short arm 18 will be at least partly above the normal oil level, but at least partially immersed with above normal oil levels, so that a relatively fast increase in buoyancy, and, hence, fast operation of the safety device, will occur with an abnormal rise of oil level.

Also, as seen in FIG. 3, an abutment 19 can be provided to extend from the operative arm adjacent the pivot and to overlie the float in such a position that a rise of oil level above normal will cause the float to engage the abutment 19 and so positively tilt the lever.

In a third embodiment of the invention seen in FIG. 4, the lower end of the operative arm 15 of the lever is formed with a nose 20 constituting a latch engageable with a catch 21, formed on part of the housing, to hold the lever in an inactive position in which the operative arm is vertical. However, a slight lifting of the lever resulting from engagement of the float with the abutment 19 will release the latch and allow the increased buoyancy of the operative arm to swing this arm into engagement with the float. A spring 22 disposed between the operative arm of the lever and the housing biases the lever out of the inactive position thereby increasing the speed and safety of operation of the lever.

In order to provide for manual closure of the inlet valve, the float is provided with an upwardly extending float-lifting arm 23 which is engaged by a cam 24 rotatable about a vertical axis and supported by the cover 25 of the housing. The upper terminal portion 23a of the float-lifting arm is inclined away from the cam so that if the cover is fitted with the cam in its float-lifting position, the cam will slide down this terminal portion and move the float-lifting arm out of its path, at the same time causing the float to be lifted.

We claim:

1. An oil flow control device comprising
    a housing defining a chamber for containing oil and having an inlet thereto,
    an inlet valve,
    a float,
    means operatively connecting the float to the inlet valve to maintain a constant level of oil in the chamber, and
    a safety device operable when the oil level exceeds a predetermined height to apply an upward force to the float, characterized in that the safety device comprises
    a lever mounted on a horizontal pivot and comprising an operative arm and a counterbalance arm,
    the operative arm of the lever, during operation of the device, extending downwardly and being partially immersed in the oil within the chamber, and
    the counterbalance arm of the lever being located at all times above the oil level in the chamber,
    the operative arm normally having no connection with the float and being movable away from the vertical, under the effect of an increase in its buoyancy resulting from an increase in oil level above said height, into a position in which it engages the float and applies an upward force thereto.

2. An oil flow control device according to claim 1 characterized in that the lower end of the operative arm is formed with a lateral extension underlying the float, the lever as a whole being generally Z shaped.

3. An oil flow control device according to claim 1 characterized in that the float is formed with a vertically extending slot into which the operative arm of the lever can move as its buoyancy increase.

4. An oil flow control device according to claim 1 characterized by a mass provided on the operative arm at a position thereon immediately above the normal oil level.

5. An oil flow control device according to claim 1 in which the lever mounting on said pivot permits limited vertical movement of the lever,
    a catch mounted on the housing,
    a latch provided on the operative arm of the lever and engageable with the catch to hold the lever in an inactive position during normal operation of the device, and
    a projection fixed to the operative arm of the lever at a position thereon in which it is engaged and lifted by the float, when the oil has exceeded said predetermined level, to move the lever relative to said pivot to release the latch from the catch and allow the lever to move into engagement with the float.

6. An oil flow control device according to claim 5 characterized by a spring acting on the lever in a sense to urge it out of its inactive position upon release of the latch from the catch.

7. An oil flow control device according to claim 1 characterized by
    a hook formed on the lower extremity of the operative arm, and
    at least one tooth undulation formed on the underside of the float for engagement by said hook.

8. An oil flow control device according to claim 1 characterized by
    a cam carried rotatably by a cover of the housing,
    a float-lifting arm having a main portion extending vertically upwards from the float for engagement with said cam, the upper end of the float-lifting arm being inclined away from the cam.

* * * * *